United States Patent
Ekendahl et al.

(10) Patent No.: US 6,372,176 B1
(45) Date of Patent: Apr. 16, 2002

(54) SYSTEM AND METHOD FOR TWIN SHEET FORMING

(75) Inventors: Lars O. Ekendahl, Kingston, NH (US); Georg Posch, Bad Reichenhall; Rudolf Landsteiner, Freilassing, both of (DE)

(73) Assignee: Kiefel Technologies Inc., Hampton, NH (US)

( * ) Notice: Subject to any disclaimer, the term of this patent is extended or adjusted under 35 U.S.C. 154(b) by 0 days.

(21) Appl. No.: 09/260,851

(22) Filed: Mar. 1, 1999

(51) Int. Cl.[7] .............................................. B29C 51/10
(52) U.S. Cl. ........................ 264/545; 264/551; 264/248; 264/250; 425/388; 156/292
(58) Field of Search ................................ 264/545, 551, 264/248, 250; 425/388, 116; 156/285, 292

(56) References Cited

U.S. PATENT DOCUMENTS

| | | | |
|---|---|---|---|
| 3,767,740 A | * 10/1973 | Jones-Hinto et al. | 264/27 |
| 3,854,860 A | 12/1974 | Haag | 425/502 |
| 3,867,088 A | 2/1975 | Brown et al. | 425/504 |
| 3,868,209 A | 2/1975 | Howell | 425/504 |
| 3,925,140 A | 12/1975 | Brown | 156/382 |
| 4,039,643 A | 8/1977 | Dean et al. | 264/92 |
| 4,427,476 A | * 1/1984 | Beck et al. | 156/199 |
| 5,108,529 A | 4/1992 | Shuert | 156/214 |
| 5,658,523 A | 8/1997 | Shuert | 264/345 |
| 5,813,355 A | * 9/1998 | Brown et al. | 108/53.3 |
| 5,814,185 A | 9/1998 | Chun et al. | 156/580 |

* cited by examiner

Primary Examiner—Jan H. Silbaugh
Assistant Examiner—Edmund H. Lee
(74) Attorney, Agent, or Firm—Bourque & Associates, P.A.

(57) ABSTRACT

A twin sheet forming system and method is used to form a hollow article, such as an automotive fuel tank, from first and second sheets of thermoplastic material. The system includes first and second loading stations, first and second heating stations, and first and second thermoforming stations in an in-line arrangement. The in-line arrangement allows the sheets to be transferred independently between the stations and the separate thermoforming stations allows the sheets to be thermoformed independently. Each of the thermoforming stations includes an upper and lower platen generally in a side by side arrangement for supporting thermoforming tools and plug assists. After heating, the sheets are independently transferred to the thermoforming stations and formed using the thermoforming tools and plug assists. The thermoforming tool and thermoformed piece in one of the thermoforming stations is then transferred to the other station, and the thermoformed pieces are fused together. The press platen in this station thus has a two stage capability for both plug assisting and fusing. In one example, the plug assist can be an insert to be secured and left within the article during the thermoforming process.

11 Claims, 9 Drawing Sheets

SYSTEM AND METHOD FOR TWIN SHEET FORMING

FIELD OF THE INVENTION

The present invention relates to twin sheet forming and more particularly, to a system and method for twin sheet forming using an in-line machine and plug assist.

BACKGROUND OF THE INVENTION

Many articles that have traditionally been made of metal or wood are now produced from thermoplastic materials. Forming automotive fuel tanks, for example, from thermoplastic materials provides a number of advantages. The fuel tank can be made in virtually any shape to fit in any available space within the automobile, thereby maximizing the use of space. Using the thermoplastic material, the automotive fuel tank can be made leak proof and more flexible, preventing the fuel tank from rupturing. Using thermoplastics and thermoforming techniques is also advantageous for other hollow or partially hollow articles.

One method for making hollow thermoplastic articles from thermoplastic material is a conventional blow molding technique. Some types of hollow articles, however, require an insert to be installed within the hollow article, and blow molding cannot be used to do this. Automotive fuel tanks, for example, often require baffles to be formed within the tank.

Twin sheet forming is another method of forming hollow articles from thermoplastic material. According to conventional twin sheet forming methods, first and second sheets of thermoplastic material are heated and thermoformed using first and second thermoforming tools, such as vacuum molds, positioned opposite one another. Before the sheet surfaces facing away from the tools have cooled, the tools are moved together or closed so that the hot surfaces of the sheets fuse together proximate the edges or in any other area that protrudes and contacts the opposing sheet. The residual heat and soft surface of the thermoplastic materials allows the sheets to fuse together.

One type of conventional twin sheet thermoforming system 10, FIG. 1, uses a rotary machine to form first and second sheets 12, 14 into a hollow article 16. The rotary machine has four stations 20, 22, 24, 26 and uses four clamp frames to rotate and index the sheets 90° to each of the stations. The first and second sheets 12, 14 are loaded at an load/unload station 20, for example, by clamping the sheets 12, 14 with clamp frames. The clamp frames are then indexed such that the first and second sheets 12, 14 are transferred respectively to first and second heating stations 22, 24. Once the sheets 12, 14 have been heated, both of the sheets 12, 14 are indexed into the forming station 26 in a rapid sequence.

The forming station 26, FIGS. 2–4, includes upper and lower platens 28, 30 that support first and second thermoforming tools 32, 34 respectively. The first sheet 12 is formed in the first thermoforming tool 32 (FIG. 2) and the second sheet 14 is formed in the second thermoforming tool 34 (FIG. 3). The upper and lower platens 28, 30, FIG. 4, are then moved together to close the thermoforming tools 32, 34 and fuse the first and second thermoformed pieces 12', 14' proximate the edges to form the article 16. The article 16 is then indexed to the load/unload station 20 for unloading.

One of the problems with this conventional twin sheet thermoforming system is in the timing of the rotary machine. Timing is critical in that the thermoformed parts 12', 14' must be brought together before the surface cools in order to properly fuse the pieces. Thinner sheets will typically cool off faster, and the slow action of the conventional rotary machine often makes the sheet cool off to such an extent that the fusing of the two sheets together is no longer possible.

Another problem that occurs in conventional twin sheet forming systems is the thinning of the sheets as they are formed into the thermoformed pieces. When forming a thermoplastic sheet into a typical female mold, the portions of the sheet that are located in the deeper cavities of the mold become substantially thinner than other areas. Forming aids, commonly referred to as plug assists, are used to distribute or prelocate the material in the deeper areas of the mold to prevent thinning. These forming aids typically include mechanical or pneumatic plug assists that move the thermoplastic sheet to the deeper areas of the mold before the vacuum pulls the thermoplastic material into those locations.

In conventional vacuum forming systems, the forming tool and the plug assist are needed at approximately the same time of the forming process. The plug assists are thus normally located on a press platen in the forming station opposite the platen supporting the forming tool. The use of plug assists in the conventional twin sheet forming system, such as the rotary system 10 described above, presents a problem in that the upper and lower platens must be used for the opposing first and second thermoforming tools and no platen is available for the plug assist tool.

Other twin sheet forming systems have attempted to use plug assists, for example, as disclosed in U.S. Pat. Nos. 3,854,860 and 5,658,523. These systems, however, have still encountered problems with timing in that the heating and forming processes cannot be performed independently for each of the sheets. The use of a single forming station with a single upper and lower platen to form both sheets can also cause problems with the different forces or loads that need to be applied during the forming process for each sheet and during the fusing process. These systems are also unable to form a hollow article having inserts formed within the hollow article, such as the baffles formed within an automotive fuel tank.

Accordingly, a need exists for a twin sheet thermoforming system and method that is capable of properly timing the transfer of the thermoplastic sheets independently from the heating station to the thermoforming station. A need also exists for a twin sheet thermoforming system and method in which a plug assist or other forming aid can be used to prevent thinning of the sheets during thermoforming without affecting the timing or the thermoforming process. A need further exists for a twin sheet forming system and method capable of forming a hollow article having one or more inserts located within the inner region of the hollow article.

SUMMARY OF THE INVENTION

The present invention features a twin sheet forming system for forming a hollow article from at least first and second sheets of thermoplastic material. The twin sheet forming system includes first and second loading stations for receiving the first and second sheets of thermoplastic material respectively and first and second heating stations for heating the first and second sheets of thermoplastic material respectively. The system also comprises first and second thermoforming stations for thermoforming the first and second sheets respectively into first and second thermoformed pieces. The second thermoforming station also presses the first and second thermoformed pieces together to fuse the first and second thermoformed pieces together. The loading stations, heating stations, and thermoforming stations are arranged in-line such that the first and second sheets of thermoplastic material are transferred independently between the stations. The system also includes a sheet transfer mechanism for transferring the first and second sheets independently from the respective loading stations to the respective heating stations to the respective thermoforming stations.

The present invention also features a thermoforming apparatus for use in a twin sheet forming system. The thermoforming apparatus comprises first and second thermoforming stations. The first thermoforming station includes a first upper platen and a first lower platen opposite the first upper platen. A first thermoforming tool is supported by the first lower platen and a first plug assist is supported by the first upper platen. A first sheet of thermoplastic material is received between the first thermoforming tool and the first plug assist. The first thermoforming station also includes a first press mechanism for pressing the first upper platen and the first lower platen toward each other such that the first thermoforming tool and the first plug assist form the first thermoplastic sheet into a first thermoformed piece in the first thermoforming tool.

The second thermoforming station includes a second upper platen and a second lower platen opposite the second upper platen. A second plug assist is supported by the second lower platen and a second thermoforming tool is supported by the second upper platen. A second sheet of thermoplastic material is received between the second thermoforming tool and the second plug assist. The second thermoforming station also includes a second press mechanism for pressing the second upper platen and the second lower platen toward each other such that the second thermoforming tool and the second plug assist form the second thermoplastic sheet into a second thermoformed piece in the second thermoforming tool.

The thermoforming apparatus further comprises a tool transfer mechanism for transferring the first thermoforming tool and the first thermoformed piece to the second thermoforming station. The second press mechanism forces the first thermoforming tool and the second thermoforming tool together such that the first and second thermoformed pieces are fused.

According to the method of twin sheet thermoforming, the first and second sheets of thermoplastic material are loaded into respective first and second loading stations. The first and second sheets of thermoplastic material are transferred to respective first and second heating stations and heated. The first and second sheets of thermoplastic material are then independently transferred from the first and second heating stations to first and second thermoforming stations respectively, where the first and second sheets of thermoplastic material are positioned between respective first and second thermoforming tools and first and second plug assists.

The first and second thermoforming tools and first and second plug assists are moved together for thermoforming the first and second sheets independently into respective first and second thermoformed pieces. The first thermoformed piece remains in the first thermoforming tool and the second thermoformed piece remains in the second thermoforming toot. The first thermoforming tool is then transferred to the second thermoforming station for positioning the first thermoformed piece opposite the second thermoformed piece. The second thermoforming tool and the first thermoforming tool are then moved together in the second thermoforming station for fusing the first and second thermoformed pieces together.

The loading stations, heating stations and thermoforming stations are preferably arranged in line. The sheets can be transferred to the thermoforming stations simultaneously or one of the sheets of thermoplastic material can be transferred to a respective one of the thermoforming stations prior to transferring the other of the sheets of thermoplastic material to the other one of the thermoforming stations. In another example, one of the plug assists is an insert that is left within a respective one of the thermoformed pieces after thermoforming.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
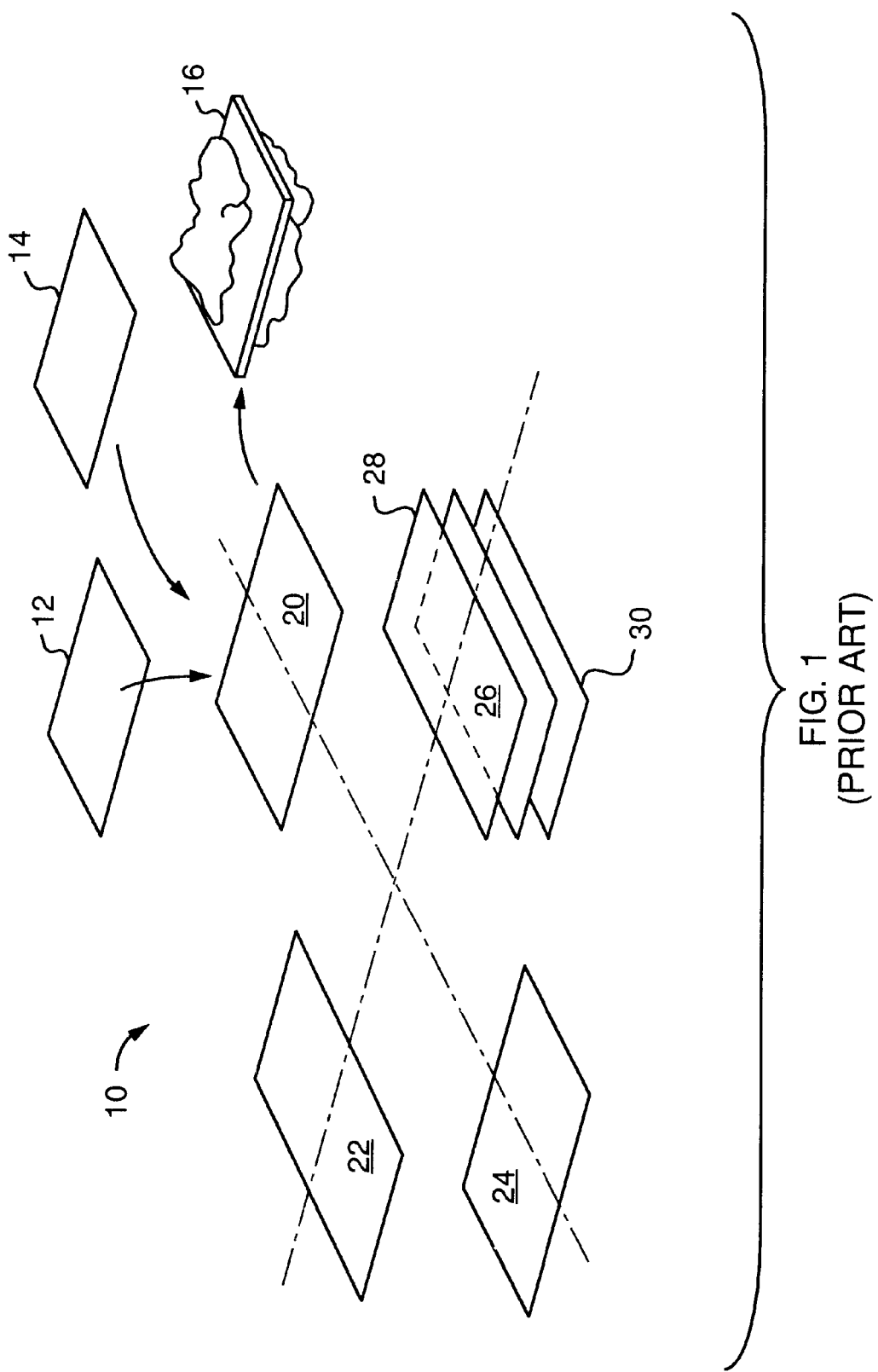
FIG. 1 is a schematic diagram of a rotary twin sheet forming system, according to the prior art.
Figure 2:
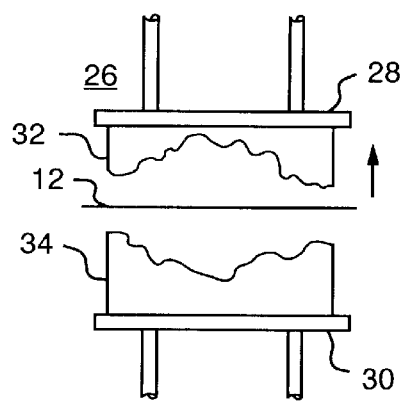
FIGS. 2–4 are side schematic views of the thermoforming station in the twin sheet thermoforming system, according to the prior art.
Figure 3:
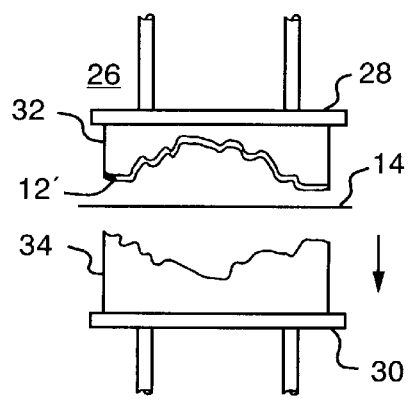
Figure 4:
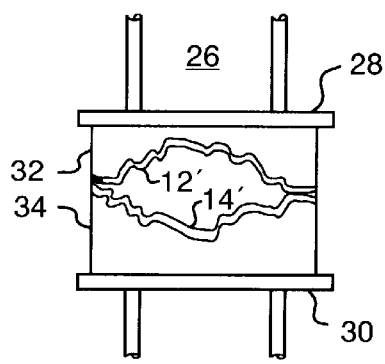
Figure 5:
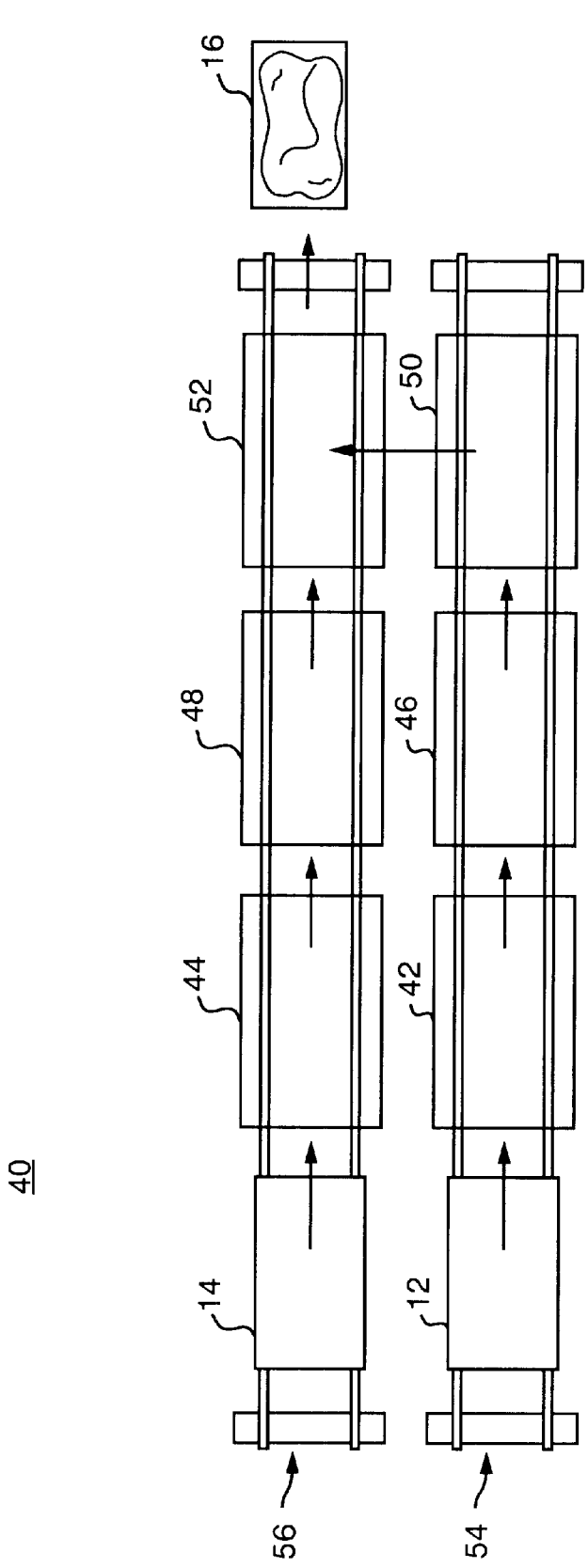
FIG. 5 is a schematic diagram of a twin sheet thermoforming system having an in-line arrangement, according to the present invention.

A twin sheet forming system 40, FIG. 5, according to the present invention is used to form first and second sheets of thermoplastic material 12, 14 into a hollow article 16. Although the exemplary embodiment of the twin sheet thermoforming system and method is used for a hollow article, such as an automotive fuel tank, the concept of the present invention can be used to form any type of article having any type of shape. The twin sheet thermoforming system 40 includes first and second loading stations 42, 44, first and second heating stations 46, 48 and first and second thermoforming stations 50, 52, preferably arranged as an in-line machine. One or more sheet transfer mechanisms 54, 56 are used to transfer or index the sheets 12, 14 independently to each of the respective stations 42–52 at the appropriate time.

In operation, the first and second sheets 12, 14 are first loaded into the respective loading stations 42, 44, for example, from roll stock or sheet stock. The sheets 12, 14 are then transferred to the respective first and second heating stations 46, 48 and are heated. After heating in the heating station 46, 48, the first and second sheets are moved to the respective thermoforming stations 50, 52. The in-line arrangement allows the first and second sheets 12, 14 to be transferred in separate "lanes" such that the sheets 12, 14 are heated side by side and can enter the respective forming stations 50, 52 independent of each other. The sheets 12, 14 can be transferred simultaneously, for example, or one of the sheets 12 can be left in one of the heating stations 48 for a longer period of time, it necessary. The first and second thermoforming stations 50, 52 then form the respective first and second sheets 12, 14 into thermoformed pieces, and the thermoformed piece in the first thermoforming station 50 is transferred to the second thermoforming station 52 for fusing the pieces together, as will be described in greater detail below.

According to the preferred embodiment, a sheet transfer mechanism 54, 56 is provided for each "lane". These devices grip the sheets 12, 14 along two of the four sides and move them through the machine. The non clamped edges of the sheets can be clamped in the heating and forming station by cross bars that are temperature controlled, sometimes referred to as thermal clamping since the plastic remains stiff in the areas of lower temperatures.

One example of the sheet transfer mechanism(s) 54, 56 (shown schematically in FIG. 5) includes a unidirectional chain (or belt) conveying system that moves the sheets 12, 14 from station to station by a linear motion. The sheets are gripped on one or both sides by pins attached to a chain. The back up force on the opposite side can be provided by rollers or bearings on an adjustable rail. In the exemplary embodiment, a pair of chains or belts is provided in each of the "lanes." Another example of the sheet transfer system 54, 56 is a reciprocating shuttle that grips the sheets 12, 14 along the edges during the forward motion and releases the sheet during the retracting motion. Both of these systems can operate with a very high precision in order to save sheet material. Saving material, e.g., in the size and thickness of the sheets, is one advantage the in-line system of the present invention has over the prior art. The present invention contemplates other ways of transferring or indexing the sheets 12, 14 independently through the stations in an in-line machine, such as the manual transfer of sheets, rotational devices holding the sheets on two or more sides, or moving mechanical frames that attach to holes in the sheet.

According to one example, the heating stations 42, 44 include conventional heaters, such as infrared radiators that transmit energy by infra red radiation that is absorbed by the sheet stock. This is normally done on both sides of the sheet. The heating stations 42, 44 can also include short wave length radiators that penetrate the sheet and have a multi-pass heating effect. The energy not absorbed by the sheet will be reflected by heating banks and reflectors on the other side of the sheet. The present invention contemplates other types of heating devices capable of heating thermoplastic materials for purposes of thermoforming.

Figure 6:
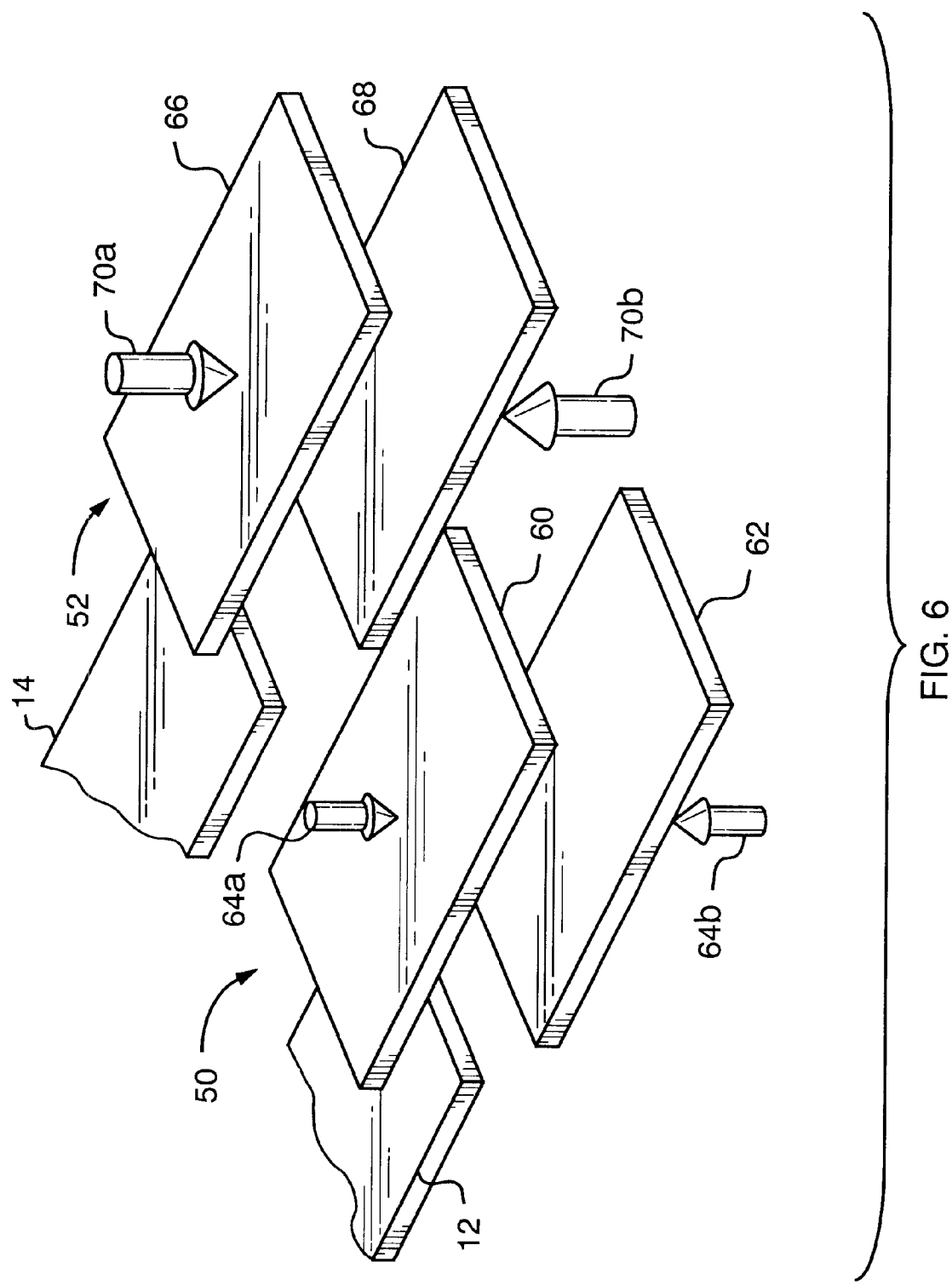
FIG. 6 is a perspective schematic diagram of the first and second thermoforming stations in the twin sheet thermoforming system, according to the present invention.

The first and second forming stations 50, 52, FIG. 6, are generally positioned adjacent one another in a side-by-side relationship. The first forming station 50 includes first upper and lower platens 60, 62. The first upper and lower platens 60, 62 are capable of providing the forces needed to thermoform the first sheet 12, as indicated by the arrows 64a, 64b. The second thermoforming station 52 includes second upper and lower platens 66, 68. The second upper and lower platen 66, 68 are capable of providing the lower force needed to form the second sheet 14 as well as the higher forces needed to press and fuse the thermoformed pieces together, as indicated by arrows 70a, 70b. The second thermoforming station 52 thus performs both thermoforming and fusing operations. This side-by-side arrangement of the first and second thermoforming stations 50, 52 allows for the use of plug assists, as described in greater detail below.

Figure 7:
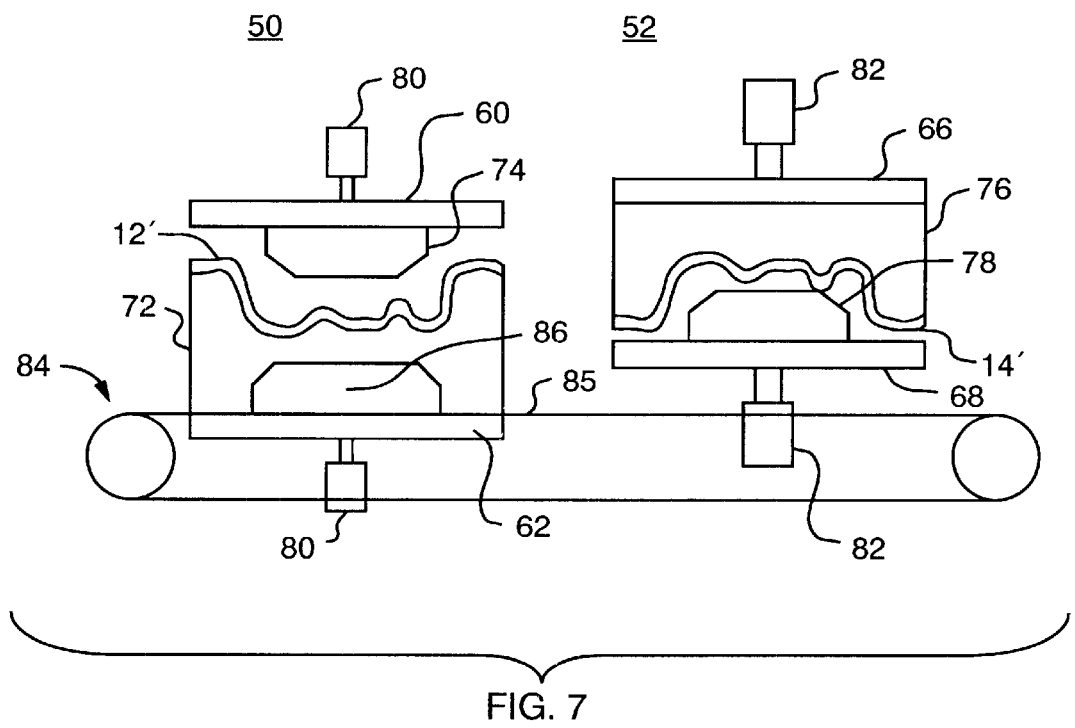
FIG. 7 is a side schematic view of the first and second thermoforming stations during the thermoforming process, according to one embodiment of the present invention.

According to the preferred embodiment, the first and second thermoforming stations 50, 52, FIG. 7, each include a thermoforming tool, such as a female vacuum mold, and a plug assist. The first thermoforming station 50, for example, includes a first thermoforming tool 72 supported by the first lower platen 62 and a first plug assist 74 supported by the first upper platen 60. The second thermoforming station 52 includes a second thermoforming tool 76 supported on the second upper platen 66 and a second plug assist 78 supported by the second lower platen 68. The thermoforming tools 72, 76 and plug assists 74, 78 could be reversed provided one thermoforming tool is supported by one of the upper platens and the other thermoforming tool is supported by one of the lower platens.

In one example, the first thermoforming tool 72 also includes a recessed region 86 and the second plug assist 78 is preferably shaped to be received within the recessed region 86, as described in greater detail below. Although the plug assists 74, 78 and thermoforming tools 72, 76 are shown schematically with a particular shape, plug assists and thermoforming tools having any particular shape can be used. Other types of forming aids and thermoforming tools can also be used.

The first thermoforming station 50 also includes one or more press mechanisms 80 capable of providing the low force needed to apply the plug assist 74 during thermoforming. The second thermoforming station 52 includes one or more press mechanisms 82 capable of applying the low force needed to use the second plug assist 78 during thermoforming and the high force needed to press the thermoformed pieces together during fusing. The press mechanisms 80, 82 can apply a force to one or both of the upper and lower platens in the respective thermoforming stations 50, 52. In one example, the lower force needed for thermoforming is typically about 5–10% of the higher force needed for fusing in the second thermoforming station 52. In one example of a fuel tank application where a pair of fuel tanks are formed, the size of the press platens is about 4' by 10–12' and the maximum force needed for fusing the two fuel tanks can be about 200 tons. Examples of the press mechanisms 80, 82 include, but are not limited to: hydraulic presses with prefill of press force cylinders; rack and pinion drive for travel stroke with locking mechanism for platens and inflation of air bags for closing pressure; and motor driven toggle mechanisms for fast closing speeds and high holding force with toggle effects.

A tool transfer mechanism 84 is operably coupled to the first thermoforming tool 72, for transferring the first thermoforming tool 72 from the first thermoforming station 50 to the second thermoforming station 52. One example of the tool transfer mechanism 84 is a conveyor 85, as shown schematically in FIGS. 7 and 8. Another example of the tool transfer mechanism includes a pivoting arm mechanism 88, as shown schematically in FIGS. 10 and 11, that pivots and moves the tool 72 in a track (not shown) in the platen 62. The tool transfer mechanism 84 preferably has the primary function of accelerating and decelerating the tool so that a fast transfer can be made possible. The faster the transfer can be made, the less force that is needed for fusing the material. Servo motors and mechanical devices are preferred over pneumatic and hydraulic devices.

In operation, after heating in the heating stations 46, 48 (FIG. 5), the heated first and second sheets 12, 14 are independently indexed into the respective first and second thermoforming stations 50, 52. In the exemplary embodiment, the sheets 12, 14 are secured with thermal clamping of the edges of the sheets 12, 14 as they are moved from the heating stations 46, 48 to the thermoforming stations 50, 52. In other words, the edges of the sheets are held during heating to prevent heat from being applied, and the lower temperature at the edges maintains the stiffness in the material that is normally present at room or near room temperature. The first sheet 12 is positioned between the first thermoforming tool 72 and the first plug assist 74 within the first thermoforming station 50. The second sheet 14 is positioned between the second thermoforming tool 76 and the second plug assist 78 within the second thermoforming station 52.

The first and second sheets 12, 14 are then thermoformed. The press mechanisms 80, 82 move the respective upper and lower platens 60, 62, 66, 68 together, and the first and second plug assists 74, 78 manipulate the first and second sheets 12, 14 while a vacuum or other type of force is applied to the sheets 12, 14. The sheets are then drawn into the respective thermoforming tools 72, 76 and formed as thermoformed pieces 12', 14'. The plug assists 74, 78 are used to prelocate the material in the areas of the mold that might cause the material to thin, thereby achieving a substantially equal thickness throughout the thermoformed piece 12', 14'.

Although FIG. 7 shows the thermoforming taking place simultaneously in the thermoforming stations 50, 52, this is not a limitation of the present invention. One advantage in using separate thermoforming stations in an in-line arrangement is that the sheets can be moved and formed independently. Thus, thermoforming of one sheet can be initiated while the other sheet remains in the heating station. Thermoforming of the first sheet 12 with the first thermoforming tool 72, for example, can be initiated first, because of the additional function that has to be performed with this tool 72.

Figure 8:
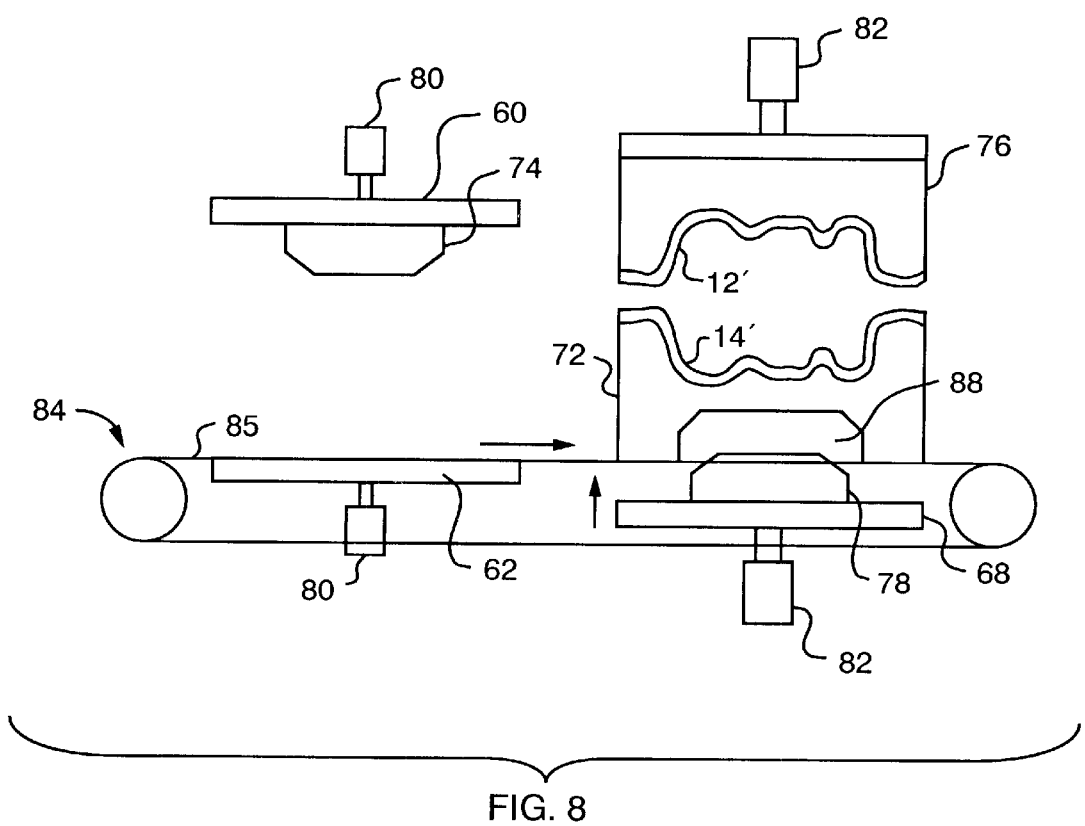
FIG. 8 is a side schematic view of the first and second thermoforming stations during the fusing process, according to one embodiment of the present invention.
Figure 9:
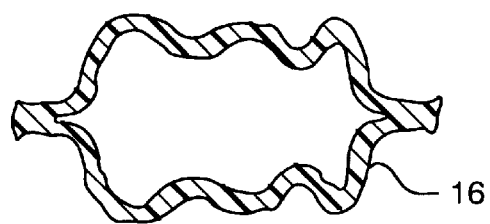
FIG. 9 is a cross-sectional view of a hollow article produced using the twin sheet thermoforming system and method, according to the present invention.

When the thermoforming is finished, the tool transfer mechanism 84, FIG. 8, transfers the first thermoforming tool 72 to the second thermoforming station 52. In this embodiment, the second plug assist 78 is preferably received in the recessed region 86 of the first thermoforming tool 72, allowing the second plug assist 78 to remain in position in the second thermoforming station 52. The second press mechanism 82 then applies the high force needed to press the first and second thermoforming tools 72, 76 together and fuse the first and second thermoformed pieces 12', 14' proximate the edges and/or at any other contacting region. The second thermoforming station 52 thus applies a low force during the first stage of thermoforming and plug assisting and applies a high force during the second stage of closing and fusing. The first plug assist 74 preferably remains in position in the second thermoforming station 50. When fusing is complete, the hollow article 16, FIG. 9, is unloaded.

According to variations of this method, inserts of various kinds can be installed or included between the thermoformed sheets 12', 14'. The side-by-side arrangement of the first and second thermoforming stations 50, 52 where thermoforming is performed in separate stations facilitates the placement of inserts between the thermoformed pieces.

Figure 10:
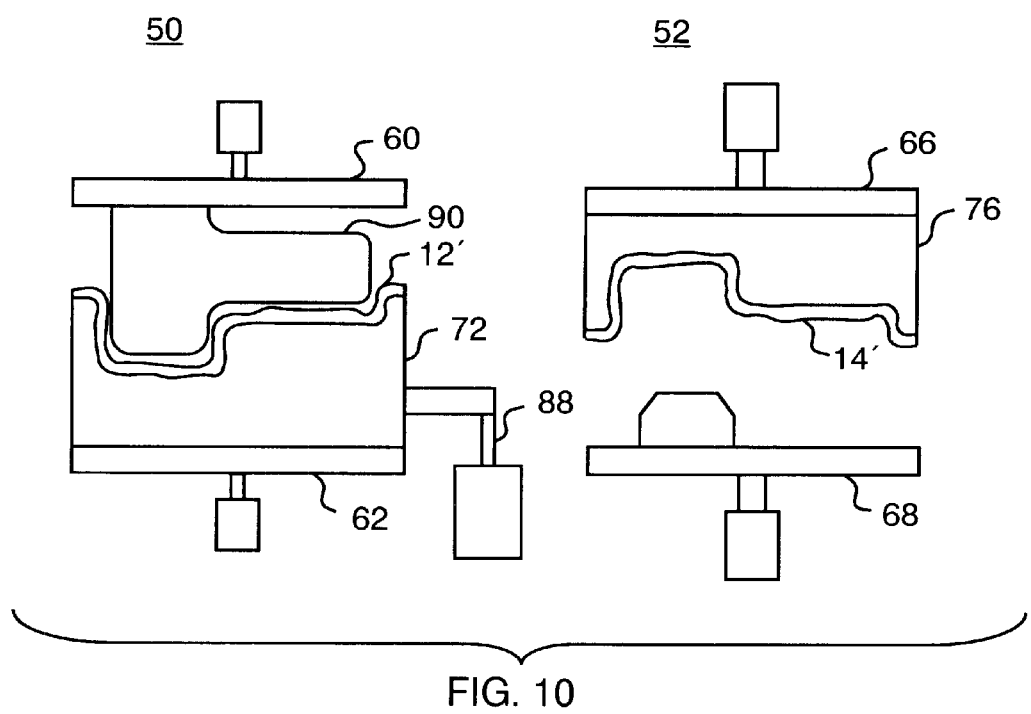
FIG. 10 is a side schematic view of the first and second thermoforming stations during the thermoforming process, according to another embodiment of the present invention.
Figure 11:
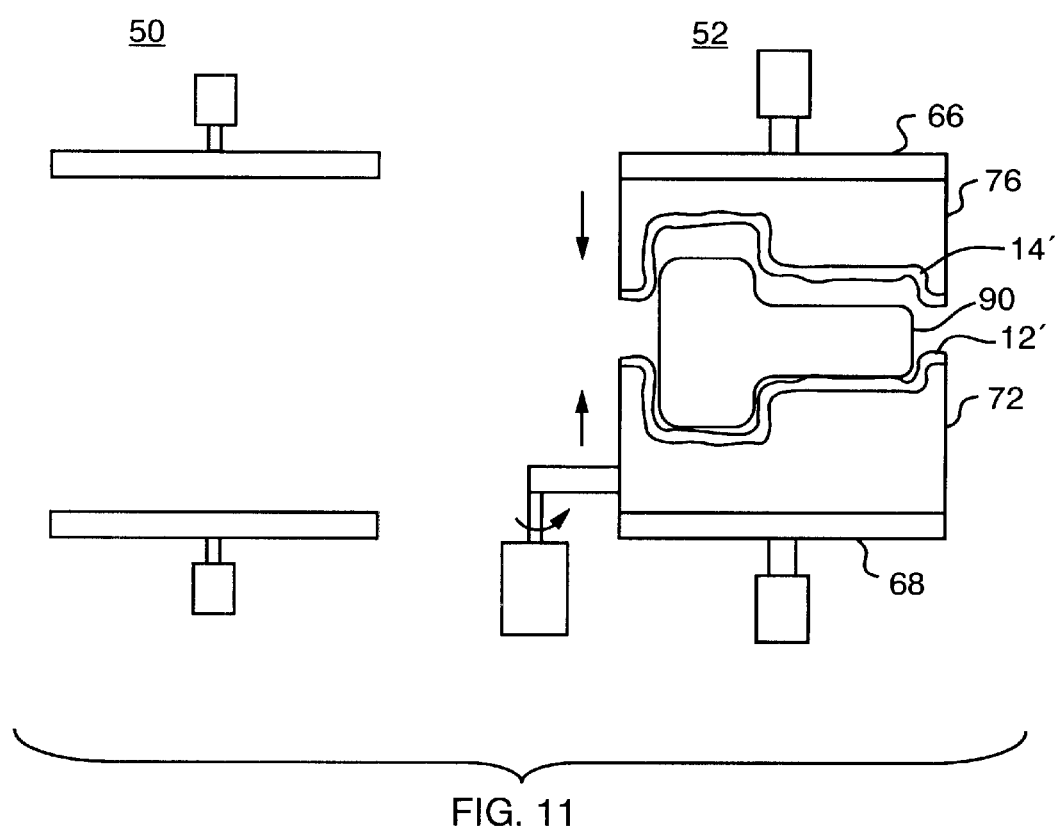
FIG. 11 is a side schematic view of the first and second thermoforming stations during the fusing process, according to the embodiment shown in FIG. 10.

One example of installing an insert 90 is shown in greater detail in FIGS. 10 and 11. According to this method, the thermoforming is performed in a manner similar to that described above, but the insert 90 is placed within the cavity 92 of the first thermoformed piece 12' in the first thermoforming station 50 before transferring the first thermoformed piece 12' to the second thermoforming station 52. In this example, the insert 90 is also used for plug assisting and is left in place within the cavity of the thermoformed piece 12' after thermoforming (FIG. 11). The insert 90 is thus fused within the cavity of the first thermoformed piece 12' in the first thermoforming station 50 and is fused within the cavity of the second thermoformed piece 14' in the second thermoforming station 52.

Figure 12:
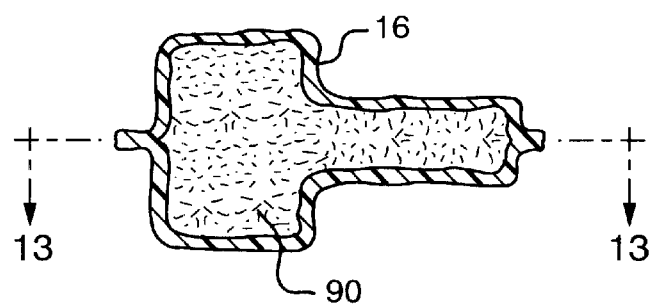
FIG. 12 is a cross-sectional side view of a hollow article produced using the twin sheet thermoforming system and method, according to the embodiment shown in FIGS. 10 and 11.
Figure 13:
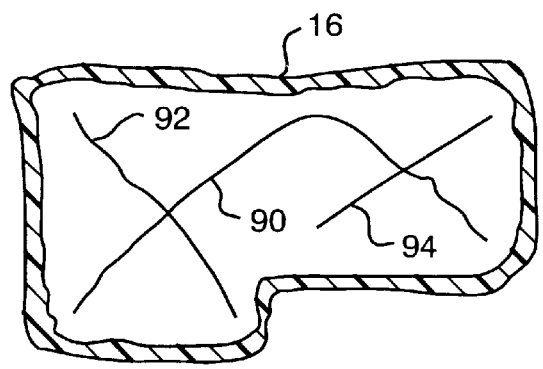
FIG. 13 is a cross-sectional top view of the hollow article shown in FIG. 12 taken generally along line 13—13.

As a result, the article 16, FIGS. 12 and 13, includes the insert 90 within the interior region between the thermoformed pieces as an integral part of the hollow article 16, increasing the strength of the article 16. When forming an automotive fuel tank, for example, one or more inserts 90, 92, 94 can be used to form baffles located as a vertical wall within the tank that prevents the liquid from washing back and fourth inside the tank.

Although the exemplary embodiment shows only one of the thermoforming stations 50 with an insert/plug assist 90, the other thermoforming station 52 can also include an insert/plug assist. Multiple plug assists/inserts can be applied by one or both of the thermoforming stations 50, 52. If the second thermoforming station 52 includes an insert/plug assist that is left within the thermoformed piece, the first thermoforming tool 72 does not require any type of recess.

Accordingly, the twin sheet thermoforming system and method of the present invention is implemented as an in-line arrangement that allows the sheets to be indexed independently from the heating stations to the thermoforming stations and timed appropriately. The twin sheet thermoforming system and method of the present invention also includes first and second thermoforming stations arranged side by side to enable the use of plug assists without adversely affecting the thermoforming and fusing processes and without significantly adding to the mechanical complexity of the machine. The side-by-side arrangement of the thermoforming stations also allows inserts, such as baffles, to be used as plug assists and to be easily installed within the interior of the hollow article.

Modifications and substitutions by one of ordinary skill in the art are considered to be within the scope of the present invention which is not to be limited except by the claims which follow.

What is claimed is:

1. A method of twin sheet thermoforming comprising:

loading first and second sheets of thermoplastic material into respective separate first and second loading stations;

transferring the loaded first and second sheets of thermoplastic material to respective separate first and second heating stations;

heating said first and second sheets of thermoplastic material within said respective separate first and second heating stations;

independently transferring the heated first and second sheets of thermoplastic material from said first and second heating stations to separate first and second thermoforming stations respectively, wherein the heated first and second sheets of thermoplastic material are positioned between respective first and second thermoforming tools and first and second plug assists;

moving said first and second thermoforming tools and said first and second plug assists together for thermoforming said first and second sheets independently into respective first and second thermoformed pieces, wherein said first thermoformed piece remains in said first thermoforming tool and said second thermoformed piece remains in said second thermoforming tool;

transferring said first thermoforming tool to said second thermoforming station, for positioning said first thermoformed piece opposite said second thermoformed piece; and moving said first thermoforming tool and said second thermoforming tool together in said second thermoforming station, for fusing said first and second thermoformed pieces together.

2. The method of claim 1 wherein the step of loading includes loading said first and second sheets of thermoplastic material from roll stock.

3. The method of claim 1 wherein the step of loading includes loading said first and second sheets of thermoplastic material from sheet stock.

4. The method of claim 1 wherein said first and second sheets of thermoplastic material are transferred in-line from said first and second loading stations to said first and second heating stations and to said first and second thermoforming stations.

5. The method of claim 1 wherein said second thermoforming station applies a force to fuse said first and second thermoformed pieces that is greater than a force applied by said first and second thermoforming stations to thermoform said first and second sheets of thermoplastic material.

6. The method of claim 1 wherein one of said first and second sheets of thermoplastic material is transferred to a respective one of said first and second thermoforming stations prior to transferring the other of said first and second sheets of thermoplastic material to the other one of said first and second thermoforming stations.

7. The method of claim 1 wherein said first and second sheets of thermoplastic material are transferred simultaneously to said first and second thermoforming stations.

8. The method of claim 1 wherein at least one of said first and second plug assists is an insert, and wherein said insert is left within a respective one of said first and second thermoformed pieces after thermoforming.

9. The method of claim 8 wherein said insert is fused to an inner surface of both said first and second thermoformed pieces.

10. The method of claim 1 further including thermal clamping edges of said first and second sheets of thermoplastic material at said first and second heating stations, wherein said edges are thermally clamped as said first and second thermoplastic material are moved from said heating stations to said thermoforming stations.

11. The method of claim 1 wherein said plug assists manipulate said first and second sheets of thermoplastic material while a vacuum force is applied by first and second thermoforming tools.

* * * * *